United States Patent
Lu

(10) Patent No.: US 9,707,592 B2
(45) Date of Patent: *Jul. 18, 2017

(54) METHOD OF FORMING AN ANTI-GLARE COATING ON A SUBSTRATE

(71) Applicant: PPG INDUSTRIES OHIO, INC., Cleveland, OH (US)

(72) Inventor: Songwei Lu, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/818,359

(22) Filed: Aug. 5, 2015

(65) Prior Publication Data

US 2016/0038972 A1     Feb. 11, 2016

Related U.S. Application Data

(63) Continuation-in-part of application No. 14/455,109, filed on Aug. 8, 2014, now abandoned.

(51) Int. Cl.

| | |
|---|---|
| G02B 1/11 | (2015.01) |
| C09D 183/06 | (2006.01) |
| B05D 5/06 | (2006.01) |
| B05D 1/02 | (2006.01) |
| B05D 3/00 | (2006.01) |
| G02B 1/111 | (2015.01) |
| C09D 4/00 | (2006.01) |
| C08G 77/04 | (2006.01) |
| C08G 77/14 | (2006.01) |

(52) U.S. Cl.
CPC ............ B05D 5/06 (2013.01); B05D 1/02 (2013.01); B05D 3/002 (2013.01); C09D 4/00 (2013.01); C09D 183/06 (2013.01); G02B 1/111 (2013.01); *C08G 77/045* (2013.01); *C08G 77/14* (2013.01)

(58) Field of Classification Search
USPC ....... 428/1.32, 1.62, 447; 427/256, 314, 387
See application file for complete search history.

(56) References Cited

U.S. PATENT DOCUMENTS

| | | |
|---|---|---|
| 3,635,751 A | 1/1972 | Long, III et al. |
| 4,753,827 A | 6/1988 | Yoldas et al. |
| 5,725,957 A | 3/1998 | Varaprasad et al. |
| 6,440,491 B1 | 8/2002 | Varaprasad et al. |
| 6,808,812 B2 * | 10/2004 | White, Jr. ............. C08G 77/58 428/447 |
| 7,723,404 B2 | 5/2010 | Cheng et al. |
| 8,003,194 B2 | 8/2011 | Richter et al. |
| 2002/0061407 A1 | 5/2002 | Colton et al. |
| 2002/0197409 A1 | 12/2002 | Varaprasad et al. |
| 2006/0110580 A1 * | 5/2006 | Aylward ............. G02B 26/004 428/172 |
| 2009/0004462 A1 * | 1/2009 | Zhang .................... C08L 83/06 428/331 |
| 2010/0054756 A1 * | 3/2010 | Nishihara .......... H04B 10/5051 398/185 |
| 2012/0200929 A1 | 8/2012 | Lu |
| 2012/0218640 A1 | 8/2012 | Gollier et al. |
| 2014/0176827 A1 | 6/2014 | Gollier et al. |
| 2015/0203718 A1 | 7/2015 | Hosoda et al. |

FOREIGN PATENT DOCUMENTS

| | | |
|---|---|---|
| CN | 201310438218 | 9/2013 |
| EP | 0356229 | 2/1990 |
| EP | 1144486 B1 | 12/1999 |
| JP | H5-85714 | 4/1993 |
| WO | 2012/166407 | 12/2012 |
| WO | 2014/011328 | 1/2014 |

* cited by examiner

*Primary Examiner* — Tae H Yoon
(74) *Attorney, Agent, or Firm* — Krisanne Shideler

(57) ABSTRACT

A method of forming an anti-glare coating on a substrate is provided. The method comprises: (a) heating the substrate to a temperature of at least 100° F. (37.8° C.) to form a heated substrate; (b) applying a curable film-forming sol-gel composition on at least one surface of the heated substrate, to form a coated substrate with a sol-gel network layer having a surface roughness; and (c) subjecting the coated substrate to conditions for a time sufficient to effect cure of the sol-gel layer and form an anti-glare, coated article. The sol-gel network layer is essentially free of inorganic oxide particles and comprises:

(i) a tetraalkoxysilane;

(ii) an epoxy functional trialkoxysilane;

(iii) a metal-containing catalyst; and (iv) a solvent component. Coated articles prepared by the method above and demonstrating anti-glare properties are also provided.

25 Claims, No Drawings

METHOD OF FORMING AN ANTI-GLARE COATING ON A SUBSTRATE

CROSS-REFERENCE TO RELATED APPLICATIONS

This application is a continuation-in-part of U.S. patent application Ser. No. 14/455,109, filed on Aug. 8, 2014, and entitled "METHOD OF FORMING AN ANTI-GLARE COATING ON A SUBSTRATE", now abandoned, which is incorporated herein by reference in its entirety.

FIELD OF THE INVENTION

The present invention relates to coated articles and methods of forming anti-glare coatings on a substrate.

BACKGROUND OF THE INVENTION

Hand-held and other electronic devices have become an intrinsic part of everyday life. In addition to the convenient services they provide, their sleek, modern appearance is essential to their marketability. Shapes, colors, and surfaces are optimized to maximize consumer appeal. Some housing and display surfaces are high gloss while others are matte finish, with combinations providing particular aesthetic appeal.

Transparent screens such as display screens and touch screens appear more and more frequently on interactive electronic devices. Reducing glare of the screens is desired to maximize visibility of the displays in different lighting environments. There are various known methods of reducing the glare of transparent substrate surfaces. An exemplary method involves depositing a light interference coating stack on the substrate that reduces reflection by exploiting the optical interference within adjacent thin films. Such films usually have a thickness of about one-quarter or one-half the nominal wavelength of visible light, depending on the relative indices of refraction of the coatings and substrate. Another method includes forming a light scattering means at the surface of the substrate, such as by mechanically altering the outermost surface of the substrate or through use of a diffuser coating on the glass substrate.

Interference coatings reduce glare without reducing resolution. However, they are relatively expensive to deposit, requiring the use of vacuum deposition techniques such as sputtering and precise manufacturing conditions, or very precise alkoxide solution dip coating techniques, with subsequent drying and firing steps. Strict processing parameters must be observed to obtain the desired results.

Fillers are widely used in the coatings industry to affect gloss and they are known to provide glare resistance to both transparent and opaque (such as metal) substrates in many cases. Fillers control gloss by affecting the surface roughness of an applied coating.

Etching the outer surface of the substrate or otherwise chemically or mechanically modifying the outer surface of a coating deposited on the substrate has been attempted in an effort to reduce glare by diffusion of light. There are numerous drawbacks to such modification techniques. Etching by chemical means involves handling and storage of generally highly corrosive compounds (e.g. hydrofluoric acid). Such compounds create processing and disposal problems in view of increasingly stringent environmental laws. Etching by non-chemical means, such as by sandblasting, necessitates additional and costly processing operations.

It would be desirable to provide an alternative method of forming an anti-glare coating on a substrate while avoiding the drawbacks of the prior art.

SUMMARY OF THE INVENTION

A method of forming an anti-glare coating on a substrate is provided. The method comprises: (a) heating the substrate to a temperature of at least 100° F. (37.8° C.) to form a heated substrate; (b) applying a curable film-forming sol-gel composition on at least one surface of the heated substrate, to form a coated substrate with a sol-gel network layer having a surface roughness; and (c) subjecting the coated substrate to conditions for a time sufficient to effect cure of the sol-gel layer and form an anti-glare, coated article. The sol-gel network layer is essentially free of inorganic oxide particles and comprises:
  (i) a tetraalkoxysilane;
  (ii) an epoxy functional trialkoxysilane;
  (iii) a metal-containing catalyst; and
  (iv) a solvent component; and
Coated articles demonstrating anti-glare properties and prepared by the method above are also provided.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photoinitiation such as by exposure to ultraviolet light or other actinic radiation.

The term "cure", "cured" or similar terms, as used in connection with a cured or curable composition, e.g., a "cured composition" of some specific description, means that at least a portion of any polymerizable and/or cross-linkable components that form the curable composition is polymerized and/or crosslinked. Additionally, curing of a composition refers to subjecting said composition to curing conditions such as those listed above, leading to the reaction of the reactive functional groups of the composition. The term "at least partially cured" means subjecting the composition to curing conditions, wherein reaction of at least a portion of the reactive groups of the composition occurs. The composition can also be subjected to curing conditions such that a substantially complete cure is attained and wherein further curing results in no significant further improvement in physical properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such a glazing, or in combination with an optical article.

The term "rigid", as used for example in connection with an optical substrate, means that the specified item is self-supporting.

The term "optical substrate" means that the specified substrate exhibits a light transmission value (transmits incident light) of at least 4 percent, such as at least 50 percent, or at least 70 percent, or at least 85 percent; and exhibits a haze value of less than 5 percent, e.g., less than 1 percent or less than 0.5 percent, when the haze value is measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "transparent", as used for example in connection with a substrate, film, material and/or coating, means that the indicated substrate, coating, film and/or material has the property of transmitting light so that objects lying beyond are entirely visible.

Substrates suitable for use in the method of the present invention and preparation of the coated articles of the present invention can include metals, glass, or any of the plastic optical substrates known in the art, provided the material can withstand temperatures of at least 100° F. without deformation. Suitable metal substrates include unpolished or polished substrates made of, for example, stainless steel or other steel alloy, aluminum, or titanium. A polished metal substrate typically has a reflective surface. For example, the curable film-forming sol-gel composition may be deposited over a surface comprising a reflective material such as a polished metal, having a total reflectance of at least 30%, such as at least 40%. "Total reflectance" refers herein to the ratio of reflected light from an object relative to the incident light that impinges on the object in the visible spectrum integrating over all viewing angles. "Visible spectrum" refers herein to that portion of the electromagnetic spectrum between wavelengths 400 and 700 nanometers. "Viewing angle" refers herein to the angle between the viewing ray and a normal to the surface at the point of incidence. The reflectance values described herein may be determined using a Minolta Spectrophotometer CM-3600d or X-Rite i7 Color Spectrophotometer from X-Rite.

Aesthetically pleasing designs and effects may be achieved on a polished metal reflective surface by applying the curable film-forming sol-gel composition to portions of the surface, for example, in a visual pattern, or on the entire surface of the reflective substrate.

Suitable glass substrates include soda-lime-silica glass, such as soda-lime-silica slide glass sold from Fisher, or aluminosilicate glass such as Gorilla® glass from Corning Incorporated, or Dragontrail® glass from Asahi Glass Co., Ltd. Suitable examples of plastic substrates include polyol (allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polyol(meth) acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products.

In the first step of the method of the present invention, the substrate is heated to a temperature of at least 100° F. (37.8° C.) to form a heated substrate. Depending on the nature of the substrate, higher temperatures may be used. For example, when the substrate is glass, the substrate may be heated to a temperature of 100 to 450° F. (37.8 to 232.2° C.), such as 230 to 400° F. (110 to 204.4° C.), or 250 to 350° F. (121.1 to 176.7° C.).

In step (b) of the method of the present invention, a curable film-forming sol-gel composition is applied to at least one surface of the heated substrate, to form a coated substrate with a sol-gel network layer having a surface roughness. Sol-gels are dynamic systems wherein a solution ("sol") gradually evolves into a gel-like two-phase system containing both a liquid phase and solid phase, whose morphologies range from discrete particles to continuous polymer networks within the continuous liquid phase.

The sol-gel network layer that is formed on the heated substrate comprises a hybrid "inorganic-organic" network; i.e., the network layer comprises both inorganic and organic structural groups on the molecular level. This allows for some variability in design with respect to mechanical properties of the sol-gel layer, such as flexibility. The high temperature of the heated substrate allows for rapid evaporation of any solvents, minimizing flow of the sol-gel composition on the substrate surface and thus resulting in a low gloss, anti-glare surface. A substrate at a lower temperature, e.g., at room temperature, would allow the sol-gel composition to flow over the surface and form a smooth coating.

The curable film-forming composition used to form the sol-gel layer comprises (i) a tetraalkoxysilane. Because of the sol-gel nature of the composition, the alkoxysilanes are hydrolyzed and they are partially condensed prior to curing of the layer. The hydrolyzed tetraalkoxysilane in the sol-gel layer typically comprises tetramethoxysilane and/or tetraethoxysilane.

The curable film-forming sol-gel composition further comprises (ii) an epoxy functional trialkoxysilane, such as 3-glycidoxypropyl trimethoxysilane, and 3-(Glycidyloxypropyl)triethoxysilane. The epoxy functional trialkoxysilane may be partially hydrolyzed with water.

The curable film-forming sol-gel composition additionally comprises (iii) a metal-containing catalyst, such as an aluminum-containing catalyst. Examples include aluminum hydroxychloride or aluminum acetylacetonate. Colloidal aluminum hydroxychloride catalysts are available from Summit Reheis as SUMALCHLOR 50 and from NALCO as NALCO 8676.

The curable film-forming sol-gel composition also comprises (iv) a solvent component. The solvent component may include water and one or more polar organic solvents, including ethers such as cyclic ethers, glycol ethers, alcohols having 1 to 6 carbon atoms, such as methanol, ethanol, n-propanol, isopropanol, n-butanol, and the like. Glycol ethers such as propylene glycol methyl ether, propylene glycol methyl ether acetate, dipropylene glycol monomethyl ether, and/or diethylene glycol monobutyl ether are used most often.

The curable film-forming sol-gel composition used in the method of the present invention forms a sol-gel network layer on the substrate surface that is essentially free of inorganic oxide particles such as silica or aluminum oxide particles. As used throughout this specification, including the claims, by "essentially free" is meant that if a compound is present in a composition, it is present incidentally in an amount less than 0.1 percent by weight, often less than 0.05 percent by weight or less than 0.01 percent by weight, usually less than trace amounts.

The curable film-forming sol-gel compositions can include a variety of optional ingredients and/or additives that are somewhat dependent on the particular application of the final coated article. For example, the composition may exhibit a light influencing property. Other optional ingredients include rheology control agents, surfactants, initiators, catalysts, cure-inhibiting agents, reducing agents, acids, bases, preservatives, free radical donors, free radical scavengers and thermal stabilizers, which adjuvant materials are known to those skilled in the art.

The curable film-forming sol-gel compositions may include a colorant, although typically the compositions are colorless and transparent. They are also usually optically clear, having a light transmission of at least 70% and demonstrating a haze value less than 65% depending on gloss level.

As used herein, the term "colorant" means any substance that imparts color and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, quinizarin blue (D&C violet No. 2), and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2 and United States Patent Application Publication Number 20050287354. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle.

Dispersions of non-hiding, color-imparting organic pigment nanoparticles offer particularly useful aesthetic properties in the electronics industry. Such pigment dispersions are available from PPG Industries, Inc. under the trademark ANDARO. Low levels of blue nanopigments can offset any yellowing that may occur during curing of film-forming compositions. Blue or black nanopigments enhance the appearance of the anti-glare coating, particularly over black underlayers on a substrate. Moreover, colored nanopigments may be chosen to enhance or complement the underlying color of the substrate, such as if the substrate is a colored housing for a cell phone or tablet.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming sol-gel composition typically has a solids content of 0.1 to 35 percent by weight, often 0.5 to 15 percent by weight, more often 1 to 8 percent by weight, based on the total weight of the curable film-forming composition.

Suitable sol-gel compositions that may be used in step (b) of the method of the present invention include HI-GARD 1080 and HI-GARD 1080S, both commercially available from PPG Industries, Inc. The sol-gel compositions may also be further diluted with appropriate solvents as described above.

The sol-gel composition may be applied to the heated substrate by one or more of a number of methods such as spraying, dipping (immersion), spin coating, or flow coating onto a surface thereof. Spraying is used most often, such as ultrasonic spray application, precision spray application, and air atomized spray application. The sol-gel composition may be more often kept at ambient temperature immediately prior to application. Upon contact with the heated substrate, solvents are immediately vaporized from the sol-gel composition and a coated substrate is formed with a sol-gel network layer having a surface roughness. The applied porous sol-gel layer typically has a dry film thickness of less than 10 microns, often less than 5 microns, or less than 3 microns.

The sol-gel composition may be applied to the substrate surface in such a manner as to yield a coated article with a gradient gloss across its surface; i.e., a surface with a gradually increasing gloss across a selected region, an effect achieved by gradually decreasing the thickness of the applied sol-gel composition coating layer across the substrate surface. As the thickness of the coating layer decreases, the gloss across the substrate surface increases, creating a visual effect. In the method of the present invention, spray application of the sol-gel composition is used to prepare a coated article with a gradient gloss. Rather than evenly spray-applying the composition over the entire surface of the substrate to form a coating layer with a consistent thickness, the spray nozzle may be held stationary over a selected point on the substrate or may make one or more passes over a selected region of the substrate. The thickness of the applied coating decreases with distance from the spray nozzle. The effect may also be achieved using a spray nozzle with graduated flow rates.

After application of the sol-gel layer, the coated substrate is then subjected to conditions for a time sufficient to effect cure of the sol-gel layer and form an anti-glare, coated article. For example, the coated substrate may be heated to a temperature of at least 120° C. for at least 0.5 hours, to promote the continued polymerization of the composition. In particular examples, the coated substrate may be heated to a temperature of 120° C. for at least 3 hours, or the coated substrate may be heated to a temperature of at least 150° C. for at least 0.5 hours.

The sol-gel composition forms a matte finish (low gloss), anti-glare coating on the substrate. Coated articles of the present invention formed by the method described above typically demonstrate a 60° gloss value of 15 to 120 gloss units, as measured by a micro-TRI-gloss meter from BYK-Gardner GmbH. Coated articles of the present invention demonstrate reduced glare without reducing resolution of a display viewed through the article. This is particularly advantageous when the coated article is an optical article such as a screen for an electronic device such as a phone, monitor, tablet, or the like. Coated articles according to the present invention that comprise a transparent substrate typically demonstrate a light transmittance of at least 84%.

The anti-glare performance of the curable coating composition is achieved by the formation of a sol-gel network with a surface roughness on the substrate, which occurs upon impingement of the sol-gel composition on the heated substrate. The rapid evaporation of solvents from the sol-gel composition minimizes flow of the composition on the heated substrate surface, and thus prevents the formation of a smooth, high-gloss coating layer. It is noted that if the sol-gel composition is applied to the substrate without prior heating of the substrate surface to at least 100° F., an anti-glare coating does not form, but rather a smooth, high gloss coating results.

This method of forming anti-glare coatings is in contrast to methods of the prior art, which use anti-glare coatings containing inorganic oxide particles. The particles serve to decrease the gloss of the coating layer by increasing the surface roughness thereof. As noted above, the sol-gel network layer formed in the method of the present invention is essentially free of such particles.

The coated articles of the present invention may further comprise at least one additional coating composition applied to the coated article after step (c). For example, an anti-fouling coating or sealant layer may be superimposed on at least one surface of the sol-gel layer.

Suitable sealant layers may comprise perfluorosilane such as DC2700 from Dow Corning, or Optool DSX from Daikin Industry, Inc.

Optical articles of the present invention include a display element such as screens, including touch screens, on devices including cell phones, tablets, GPS, voting machines, POS (Point-Of-Sale), or computer screens; display sheets in a picture frame; windows, or an active or passive liquid crystal cell element or device, and the like.

The following examples are intended to illustrate various embodiments of the invention, and should not be construed as limiting the invention in any way.

EXAMPLES

HI-GARD® HG 1080S coating solution is commercially available from PPG Industrials, Inc. HI-GARD HG 1080S is diluted with DOWANOL™ PMA (Propylene glycol methyl ether acetate) and/or DOWANOL™ PM (Propylene glycol methyl ether), commercially available from The Dow Chemical Company, as listed in the Table below. The mixture solution is then stirred for 30 min at ambient temperature.

TABLE 1

AG (Anti-Glare) Coating Solution Formulations (in grams)

|  | HG-1080S | Dowanol PM | Dowanol PMA | Total | Solid content (%) |
|---|---|---|---|---|---|
| AG20 Coating Solution | 20 | 0 | 80 | 100 | 6.6 |
| AG60 Coating Solution | 15 | 5 | 80 | 100 | 4.95 |
| AG70 Coating Solution | 10 | 10 | 80 | 100 | 3.3 |
| AG100 Coating Solution | 5 | 40 | 55 | 100 | 1.65 |

The glass substrates, 2"×3"×1 mm microscope slide glass purchased from Fisher Scientific were heated in a 180° C. oven for 6 minutes on a metal sample holder before moving to a spray booth for spray AG coatings. The AG coating solutions were then sprayed on the glass substrates with a temperature ranging from 130 to 150° C. using a SPRAYMATION and a BINKS 95 conventional HVLP spray gun with spray parameters listed as below.

TABLE 2

Examples A through E Spray Parameters Using a SPRAYMATION and a BINKS 95 Spray Gun

|  | Example | | | | | |
|---|---|---|---|---|---|---|
|  | A | B | C | D | E | |
|  | Targeting gloss value | | | | | |
|  | GU <20 | GU60 ± 10 | GU70 ± 10 | GU80 ± 10 | GU100 ± 10 | Unit |
| AG Coating Solution | AG20 | AG60 | AG70 | AG 70 | AG100 |  |
| Air pressure | 50 | 50 | 50 | 50 | 50 | PSI |
| Distance between glass and nozzle | 5 | 5 | 5 | 5 | 5 | Inch |
| Flow rate | 47.5 | 42.4 | 43 | 37.8 | 34.8 | g/min |
| Total pass | 2 | 1 | 1 | 1 | 1 | Pass |
| Time of glass in 180° C. oven | 6 | 6 | 6 | 6 | 6 | min |
| Glass Temperature | 150 | 150 | 150 | 150 | 150 | ° C. |
| Nozzle traveling speed | 800 | 700 | 800 | 700 | 800 | inch/min |

The coated glass samples were then cured at 150° C. for 35 min.

Optical properties of the coated glass samples were measured, including gloss value at 60° angle, transmittance at 550 nm, color L*, a*, and b*, and haze. The gloss value was measured using a Micro-Tri-gloss meter from BYK-Gardner GmbH. Transmittance color and haze were measured using X-Rite i7 Color Spectrophotometer from X-Rite. Results are shown in Table 3 below.

TABLE 3

| Example | Gloss (GU) | Transmittance (%) | Haze (%) | L* | a* | b* |
|---|---|---|---|---|---|---|
| E-1 | 90 | 90.573 | 6.53 | 96.22 | −0.05 | 0.04 |
| E-2 | 102.5 | 91.119 | 3.69 | 96.45 | −0.07 | 0.06 |
| E-3 | 105 | 91.038 | 3.98 | 96.41 | −0.06 | 0.09 |
| E-4 | 96.5 | 91.025 | 3.75 | 96.4 | −0.09 | 0.1 |
| E-5 | 96 | 91.131 | 3.9 | 96.46 | −0.08 | 0.02 |
| E-6 | 102.5 | 90.858 | 3.67 | 96.35 | −0.05 | 0.1 |
| E-7 | 103.5 | 90.866 | 4.72 | 96.34 | −0.05 | 0.14 |
| E-8 | 99 | 90.973 | 3.19 | 96.38 | −0.06 | 0.09 |
| E-9 | 104 | 91.384 | 2.87 | 96.55 | −0.1 | 0.04 |
| E-10 | 104.5 | 91.271 | 2.56 | 96.5 | −0.09 | 0.06 |
| D-1 | 73.5 | 89.645 | 6.59 | 95.82 | 0 | 0.14 |
| D-2 | 69.5 | 89.866 | 5.42 | 95.92 | −0.01 | 0.16 |
| D-3 | 73 | 90.153 | 6.31 | 96.03 | −0.03 | 0.13 |
| D-4 | 73 | 90.001 | 5.72 | 95.96 | −0.02 | 0.13 |
| D-5 | 71 | 90.04 | 5.57 | 95.99 | −0.04 | 0.14 |
| D-6 | 61.5 | 89.917 | 5.48 | 95.94 | −0.03 | 0.14 |
| D-7 | 69.5 | 90.911 | 4.63 | 96.34 | −0.05 | 0.11 |
| D-8 | 93.5 | 90.923 | 4.52 | 96.36 | −0.04 | 0.09 |
| D-9 | 98.5 | 90.573 | 4.09 | 96.21 | −0.02 | 0.11 |
| D-10 | 86.5 | 90.951 | 4.48 | 96.37 | −0.02 | 0.09 |
| C-1 | 72 | 89.597 | 8.13 | 95.81 | 0.01 | 0.18 |
| C-2 | 71 | 89.481 | 6.56 | 95.76 | −0.02 | 0.13 |
| C-3 | 69 | 89.833 | 9.33 | 95.92 | 0 | 0.03 |
| C-4 | 70 | 89.41 | 8.4 | 95.73 | 0 | 0.15 |
| C-5 | 67 | 89.522 | 7.97 | 95.79 | 0 | 0.11 |
| C-6 | 70 | 89.828 | 8.25 | 95.91 | −0.01 | 0.06 |
| C-7 | 72.5 | 89.955 | 6.38 | 95.96 | −0.03 | 0.1 |
| C-8 | 61 | 88.491 | 13.41 | 95.43 | −0.08 | −0.52 |
| C-9 | 69 | 89.245 | 9.75 | 95.67 | 0.03 | 0.15 |
| C-10 | 67 | 89.612 | 8.5 | 95.83 | 0 | 0.1 |
| B-1 | 63 | 89.014 | 7.42 | 95.58 | −0.02 | 0.13 |
| B-2 | 62 | 88.795 | 8.86 | 95.49 | −0.01 | 0.12 |
| B-3 | 51.5 | 88.674 | 8.37 | 95.45 | −0.02 | 0.12 |
| B-4 | 55 | 88.402 | 10.6 | 95.32 | 0.01 | 0.07 |
| B-5 | 61.5 | 88.901 | 7.77 | 95.54 | −0.02 | 0.14 |
| B-6 | 51.5 | 88.415 | 9.49 | 95.33 | −0.01 | 0.12 |
| B-7 | 57 | 88.66 | 9.01 | 95.44 | 0.01 | 0.11 |
| B-8 | 56 | 88.726 | 7.98 | 95.46 | −0.02 | 0.12 |
| B-9 | 60.5 | 89.4 | 7.02 | 95.74 | −0.04 | 0.12 |

TABLE 3-continued

| Example | Gloss (GU) | Transmittance (%) | Haze (%) | L* | a* | b* |
|---|---|---|---|---|---|---|
| A-1 | 13.5 | 86.485 | 61.04 | 94.61 | 0.21 | −1.76 |
| A-2 | 14.5 | 85.51 | 55.44 | 94.19 | 0.22 | −1.52 |
| A-3 | 16 | 85.13 | 51.24 | 94.03 | 0.25 | −1.31 |
| A-4 | 14 | 86.125 | 57.04 | 94.46 | 0.22 | −1.61 |
| A-5 | 15 | 85.493 | 55.2 | 94.18 | 0.22 | −1.5 |
| A-6 | 13.5 | 86.333 | 57.52 | 94.55 | 0.23 | −1.6 |

TABLE 3-continued

| Example | Gloss (GU) | Transmittance (%) | Haze (%) | L* | a* | b* |
|---|---|---|---|---|---|---|
| A-7 | 13.5 | 86.584 | 61.47 | 94.65 | 0.21 | −1.78 |
| A-8 | 19 | 84.505 | 34.85 | 93.72 | 0.12 | −0.79 |
| A-9 | 14 | 86.003 | 56.82 | 94.4 | 0.19 | −1.6 |
| A-10 | 16 | 84.846 | 47.47 | 93.89 | 0.16 | −1.24 |

Example F

A composition was prepared in accordance with the present invention using nanopigment colorants. AG Coating Solution was prepared as in Example A above, including ANDARO® blue nanopigment added at 1 percent by weight, based on the total weight of the composition. The composition was applied to a glass substrate and cured as in the examples above.

Optical properties of the coated glass samples were measured, including gloss value at 60° angle, transmittance (T) at 550 nm, color L*, a*, and b*, and haze. The gloss value was measured using a Micro-Tri-gloss meter from BYK-Gardner GmbH. Transmittance color and haze were measured using X-Rite i7 Color Spectrophotometer from X-Rite. Results are shown on Table 4 below.

TABLE 4

|  | L* | a* | b* | Haze | T at 550 nm | Gloss (GU) |
|---|---|---|---|---|---|---|
| Blue AG20 | 91.79 | −1.03 | −3.51 | 29.89 | 79.98 | 19 |
| AG20 | 93.72 | 0.12 | −0.79 | 34.85 | 86.49 | 19 |

Each of the characteristics and examples described above, and combinations thereof, may be said to be encompassed by the present invention. The present invention is thus drawn to the following nonlimiting aspects: in a first aspect, a method of forming an anti-glare coating on a substrate is provided by the present invention, comprising: (a) heating the substrate to a temperature of at least 100° F. (37.8° C.) to form a heated substrate; (b) applying a curable film-forming sol-gel composition on at least one surface of the heated substrate, to form a coated substrate with a sol-gel network layer having a surface roughness; wherein the sol-gel network layer is essentially free of inorganic oxide particles and wherein the curable film-forming sol-gel composition comprises: (i) a tetraalkoxysilane; (ii) an epoxy functional trialkoxysilane; (iii) a metal-containing catalyst; and (iv) a solvent component; and (c) subjecting the coated substrate to conditions for a time sufficient to effect cure of the sol-gel layer and form an anti-glare, coated article.

In a second aspect, in the method according to the first aspect above, the substrate comprises a plastic, glass, or metal.

In a third aspect, in any of the methods according to the first or second aspects above, the substrate is a metal substrate comprising stainless steel, a different steel alloy, titanium, or aluminum.

In a fourth aspect, in the method according to the first aspect above, the substrate comprises glass and is heated in step (a) to a temperature of 230 to 450° F. (110 to 232.2° C.).

In a fifth aspect, in any of the methods according to any of the aspects above, the curable film-forming composition is spray applied to the heated substrate in step (b).

In a sixth aspect, in any of the methods according to any of the aspects above, the coated substrate is heated to a temperature of at least 120° C. for at least 0.5 hour in step (c).

In a seventh aspect, in any of the methods according to any of the aspects above, the coated article formed in step (c) demonstrates a 60° gloss value of 15 gloss units to 120 gloss units.

In an eighth aspect, in any of the methods according to any of the aspects above, the curable film-forming sol-gel composition further comprises (v) a dye or a dispersion of non-hiding, color-imparting organic pigment nanoparticles.

In a ninth aspect, in any of the methods according to any of the aspects above, the curable film-forming sol-gel composition applied to the surface of the substrate so as to yield a coated article with a gradient gloss across its surface.

In a tenth aspect, in the method of any of aspects 1-9, the tetraalkoxysilane (i) in the curable film-forming composition comprises tetramethoxysilane and/or tetraethoxysilane.

In an eleventh aspect, in the method of any of aspects 1-10, the epoxy functional trialkoxysilane (ii) in the curable film-forming composition comprises glycidoxypropyl trimethoxysilane.

In a twelfth aspect, in the method of any of aspects 1-11, the metal-containing catalyst (iii) in the curable film-forming composition comprises colloidal aluminum hydroxychloride or aluminum acetylacetonate.

In a thirteenth aspect, in the method of any of aspects 1-12, at least one additional coating composition is applied to the coated article after step (c).

In a fourteenth aspect, a coated article demonstrating anti-glare properties is provided, wherein the coated article is obtainable by a method of any of aspects 1-13.

In an fifteenth aspect, a coated article demonstrating anti-glare properties is provided by the present invention, the coated article comprising: (a) a transparent substrate having at least one flat surface; (b) a cured film-forming sol-gel composition applied to at least a portion of the flat surface of the substrate, wherein the cured film-forming sol-gel composition is deposited from a composition comprising: (i) a tetraalkoxysilane; (ii) an epoxy functional trialkoxysilane; (iii) a metal-containing catalyst; and (iv) a solvent component; and wherein the coated article demonstrates a 60° gloss value of 15 to 120 gloss units.

In a sixteenth aspect, in the coated article according to the fifteenth aspect above, the tetraalkoxysilane (i) in the curable film-forming composition comprises tetramethoxysilane and/or tetraethoxysilane.

In a seventeenth aspect, in the coated article according to either of the fifteenth or sixteenth aspect above, the epoxy functional trialkoxysilane (ii) in the curable film-forming composition comprises glycidoxypropyl trimethoxysilane.

In an eighteenth aspect, in the coated article according to any of the fifteenth, sixteenth, or seventeenth aspect above, the metal-containing catalyst (iii) in the curable film-forming composition comprises colloidal aluminum hydroxychloride or aluminum acetylacetonate.

In a nineteenth aspect, in the coated article according to any of the fifteenth, sixteenth, seventeenth, or eighteenth aspect above, the coated article demonstrates a light transmittance of at least 84% and comprises a window, touch screen, cell phone screen, tablet screen, GPS screen, voting machine screen, POS (Point-Of-Sale) screen, computer screen, display sheet in a picture frame, or an active or passive liquid crystal cell element or device.

In a twentieth aspect, in the coated article according to any of the fifteenth, sixteenth, eventeenth, or eighteenth aspect above, the substrate is a metal substrate comprising stainless steel, a different steel alloy, titanium, or aluminum.

In a twenty-first aspect, in the coated article according to any of the fifteenth, sixteenth, seventeenth, eighteenth, nineteenth, or twentieth aspect above, the curable film-forming sol-gel composition further comprises (v) a dispersion of non-hiding, color-imparting organic pigment nanoparticles.

In a twenty-second aspect, in the coated article according to any of the fifteenth, sixteenth, seventeenth, eighteenth, nineteenth, twentieth, or twenty-first aspect above, coated article demonstrates a gradient gloss across its surface.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. A method of forming an anti-glare coating on a substrate comprising:
    (a) heating the substrate to a temperature of at least 100° F. (37.8° C.) to form a heated substrate;
    (b) applying a curable film-forming sol-gel composition on at least one surface of the heated substrate, to form a coated substrate with a sol-gel network layer having a surface roughness; wherein the sol-gel network layer is essentially free of inorganic oxide particles and wherein the curable film-forming sol-gel composition comprises:
        (i) a tetraalkoxysilane;
        (ii) an epoxy functional trialkoxysilane;
        (iii) a metal-containing catalyst; and
        (iv) a solvent component; and
    (c) subjecting the coated substrate to conditions for a time sufficient to effect cure of the sol-gel layer and form an anti-glare, coated article.

2. The method of claim 1 wherein the substrate comprises a plastic, glass, or metal.

3. The method of claim 2 wherein the substrate is a metal substrate comprising stainless steel, a different steel alloy, titanium, or aluminum.

4. The method of claim 2, wherein the substrate comprises glass and is heated in step (a) to a temperature of 230 to 450° F. (110 to 232.2° C.).

5. The method of claim 1 wherein the curable film-forming composition is spray applied to the heated substrate in step (b).

6. The method of claim 1 wherein the coated substrate is heated to a temperature of at least 120° C. for at least 0.5 hour in step (c).

7. The method of claim 1 wherein the coated article formed in step (c) demonstrates a 60° gloss value of 15 gloss units to 120 gloss units.

8. The method of claim 1 wherein the curable film-forming sol-gel composition further comprises (v) a dye or a dispersion of non-hiding, color-imparting organic pigment nanoparticles.

9. The method of claim 1, wherein the curable film-forming sol-gel composition applied to the surface of the substrate so as to yield a coated article with a gradient gloss across its surface.

10. A coated article demonstrating anti-glare properties, wherein the coated article is prepared by a process comprising:
    (a) heating the substrate to a temperature of at least 100° F. (37.8° C.) to form a heated substrate;
    (b) applying a curable film-forming sol-gel composition on at least one surface of the heated substrate, to form a coated substrate with a sol-gel network layer having a surface roughness; wherein the sol-gel network layer is essentially free of inorganic oxide particles and wherein the curable film-forming sol-gel composition comprises:
        (i) a tetraalkoxysilane;
        (ii) an epoxy functional trialkoxysilane;
        (iii) a metal-containing catalyst; and
        (iv) a solvent component; and
    (c) subjecting the coated substrate to conditions for a time sufficient to effect cure of the sol-gel layer and form an anti-glare, coated article.

11. The coated article of claim 10 wherein the substrate comprises glass and is heated in step (a) to a temperature of 230 to 450° F. (110 to 232.2° C.).

12. The coated article of claim 10 wherein the curable film-forming composition is spray applied to the heated substrate in step (b).

13. The coated article of claim 10 wherein the coated article formed in step (c) demonstrates a 60° gloss value of 15 gloss units to 120 gloss units.

14. The coated article of claim 10, wherein at least one additional coating composition is applied to the coated article after step (c).

15. The coated article of claim 10 wherein the curable film-forming sol-gel composition further comprises (v) a dispersion of non-hiding, color-imparting organic pigment nanoparticles.

16. The coated article of claim 10 wherein the substrate is a metal substrate comprising stainless steel, a different steel alloy, titanium, or aluminum.

17. The coated article of claim 10 wherein the coated article demonstrates a gradient gloss across its surface.

18. A coated article demonstrating anti-glare properties, wherein the coated article comprises:
    (a) a substrate having at least one flat surface;
    (b) a cured film-forming sol-gel composition applied to at least a portion of the flat surface of the substrate, wherein the cured film-forming sol-gel composition is essentially free of inorganic oxide particles and is deposited from a composition comprising:
        (i) a tetraalkoxysilane;
        (ii) an epoxy functional trialkoxysilane;
        (iii) a metal-containing catalyst; and
        (iv) a solvent component;
    and wherein the coated article demonstrates a 60° gloss value of 15 to 120 gloss units.

19. The coated article of claim 18 wherein the tetraalkoxysilane (i) in the curable film-forming composition comprises tetramethoxysilane and/or tetraethoxysilane.

20. The coated article of claim 18, wherein the epoxy functional trialkoxysilane (ii) in the curable film-forming composition comprises glycidoxypropyl trimethoxysilane.

21. The coated article of claim 18 wherein the metal-containing catalyst (iii) in the curable film-forming composition comprises colloidal aluminum hydroxychloride or aluminum acetylacetonate.

22. The coated article of claim 18, wherein said coated article demonstrates a light transmittance of at least 84% and comprises a window, touch screen, cell phone screen, tablet screen, GPS screen, voting machine screen, POS (Point-Of-Sale) screen, computer screen, display sheet in a picture frame, or an active or passive liquid crystal cell element or device.

23. The coated article of claim 18 wherein the curable film-forming sol-gel composition further comprises (v) a dispersion of non-hiding, color-imparting organic pigment nanoparticles.

24. The coated article of claim 18 wherein the substrate is a metal substrate comprising stainless steel, a different steel alloy, titanium, or aluminum.

25. The coated article of claim 18 wherein the coated article demonstrates a gradient gloss across its surface.

* * * * *